United States Patent [19]

Schmidt et al.

[11] 4,070,673
[45] Jan. 24, 1978

[54] RADAR VIDEO DIGITAL PROCESSOR

[75] Inventors: Richard Q. Schmidt, Huntington; Herman J. Fleischer, Halesite; Walter C. Lanning, Plainview; Bert V. Tiblin, Huntington, all of N.Y.

[73] Assignee: Sperry Rand Corporation, New York, N.Y.

[21] Appl. No.: 720,473

[22] Filed: Sept. 3, 1976

[51] Int. Cl.² .............................................. G01S 9/14
[52] U.S. Cl. .............................. 343/7.3; 343/5 VQ; 343/17.1 R
[58] Field of Search ................... 343/5 DP, 7.3, 13 R, 343/17.1 R, 5 VQ

[56] References Cited
U.S. PATENT DOCUMENTS

| 3,121,870 | 2/1964 | Mortley | 343/17.1 R X |
| 3,539,978 | 11/1970 | Stedtnitz | 343/13 R X |
| 3,603,994 | 9/1971 | Williams et al. | 343/7.3 |
| 3,623,089 | 11/1971 | Bossert | 343/5 DP |
| 3,855,593 | 12/1974 | Van Hufte et al. | 343/5 DP X |

*Primary Examiner*—T.H. Tubbesing
*Attorney, Agent, or Firm*—Howard P. Terry; Seymour Levine

[57] ABSTRACT

A video processor for a track-while-scan radar system, wherein each radar return, within a tracking window, is given a range weight corresponding to the range bin within the range sweep and an angle weight corresponding to a sweep count, which is initiated at the commencement of the tracking window. The weights for each return are summed to obtain a range weighted sum and an angle weighted sum, each sum then being coupled to a computer along with the total number of radar returns recorded within the tracking window. The video processor, on information supplied by the computer, establishes an annular ring about the radar system within which radar returns are sought. To prevent the recording of a target detection upon the reception of a noise spike, a defruiting circuit is included in the search detection circuits which records a bit in a given range bin when the range bin under consideration in a given range sweep and at least one of the corresponding range bins in the preceding and succeeding range sweeps report a target return.

8 Claims, 2 Drawing Figures

RADAR VIDEO DIGITAL PROCESSOR

The invention herein described was made in the course of or under a contract or subcontract with the U.S. Navy.

BACKGROUND OF THE INVENTION

1. Field of the Invention

The present invention pertains to a system for processing radar video signals and more particularly to a digital processing system for ascertaining the range and angle centroids of detected targets in track while scan radar systems.

2. Description of the Prior Art

In a track while scan radar system target location and tracks are automatically computed from video data derived from the radar signal returns. This automatic determination of target range and azimuth present major computational problems. During each scan, radar target returns in any given range cell are compared to a preselected threshold and a hit is declared when the return exceeds this threshold. Data in a given range cell is correlated over a number of transmissions and a target is generally declared when a hit is recorded from M of N transmissions. To minimize the probability of recording a hit on a noise spike or other spurious responses (fruit), defruiting circuits are generally inserted between the threshold comparison and detecting networks. This technique provides adequate detection criteria but ambiguous information may be established when large targets are encountered which cause significant target energy to appear in more than one angular cell. Defruiting circuits of the prior art allow a hit to be recorded either when the $M^{th}$ return and any one of the M-1 previous returns indicate a target or the first of M returns and any one of the succeeding M-1 returns indicate a target. These systems are asymmetrical, bias the target angle data towards the first or $M^{th}$ return and lose one pulse in each pulse train.

Additionally, the relatively wide angular coverage of a typical radar antenna presents a serious problem in the determination of the true angular location of the target, and targets that extend over several range cells present an ambiguity regarding the location of the target's range centroid. The range centroid of an extruded target is generally determined by establishing the range over which the target extends and taking the center thereof. To determine the location of a target within the antenna beam, techniques known as beam splitting have been employed. The most successful beam splitting technique of the prior art incorporate weighting factors applied to the video derived from each radar return. Generally, the weights have odd symmetry about the beam center and the angular location of the target is determined from the central beam position in the angular range for which the sum of the weighted returns is zero as the antenna beam sweeps past the target. The accuracy of these systems is a function of the antenna beam symmetry, the target signal to noise ratio and the target fluctuations, thus requiring antennas with beam symmetry and with high signal to noise ratios.

SUMMARY OF THE INVENTION

The present invention provides a digital video processor for track while scan (TWS) radar systems. Computer generated digital signals representative of leading and trailing edges of range and azimuth intervals which define a tracking window are compared with the instantaneous range, and the stabilized angular antenna position to provide pulses to a control unit that signify the opening and closing of the tracking window. This control unit provides signals to a multiplicity of counting circuits wherein the number of pulse transmissions, range bins traversed, and radar target returns within the defined tracking windows are established. Interlocking circuits in the control unit assure full range sweeps, and therefore complete range coverage, within each tracking window. The pulse transmission and range bin counters are coupled to accumulators which are enabled by pulses from a comparator which are provided therefrom when the video for radar returns within the tracking window, exceed a given signal threshold. When the accumulator to which the pulse transmission counter is coupled is enabled, the transmission count corresponding to the enabling radar return is added to the total therein similarly obtained to achieve a weighted sum of angular returns. In a like manner, the radar return enables the accumulator to which the range bin counter is coupled and the range bin count corresponding to the instant radar return, is added to the total therein to obtain a weighted range sum. These weighted sums and the radar target return count are coupled to a computer wherein the weighted range sum and the weighted angle sum are divided by the sum of the radar returns to determine the range and angle centroids of the target.

Pulses from the comparator signifying that the radar return exceeds the signal threshold are coupled to an M of N detector which provides a pulse whenever M transmissions contain such comparator pulses in N successive transmissions within the specified tracking window. These pulses are coupled to a detector which signals the presence of multiple targets by providing a pulse to the computer whenever a string of pulses from the M of N detector ceases and then recommences. The M of N output pulses are also coupled to a counter that couples the total of such pulses to the computer to determine the subtended angle of the target.

Video processing for the search function of the radar system includes the comparison of the range bin location with stored signals representative of the leading and trailing edges of the range window, while the stabilized antenna azimuth position is compared with a stored signal representative of a given azimuth interval. When the antenna position coincides with the azimuth represented by the stored signal, an interrupt pulse is coupled to the computer signifying the completion of the azimuthal interval and a new signal is stored representative of the succeeding azimuth interval. Thus, a 360° detection ring is formed within the limit of the range window. Radar returns within this ring are coupled to a comparator wherein they are compared to a signal threshold level whereby a pulse is provided whenever the signal return exceeds this given threshold. The indication of a detection in any given azimuth interval is stored in a buffer and coupled to the computer at the completion of the azimuth interval as indicated on the interrupt pulse. To prevent the recording of random noise spikes, as radar return signals, a defruiting circuit is coupled between the comparator and the detector. This defruiter allows the recording of a radar return signal when a return is both indicated during a transmission and during transmissions either preceding or succeeding this transmission. This symmetrical comparison essentially eliminates the biasing effects that may appear in the systems of the prior art. Pulses from the comparators, in both the tracking and search circuitry, signifying that the radar return exceeds the respective noise thresholds are coupled to counters that couple the total number of pulses within the tracking and search windows to the computer to control the threshold settings to hold the noise count and false detections to preset values.

DESCRIPTION OF THE PREFERRED EMBODIMENT

Figure 1:
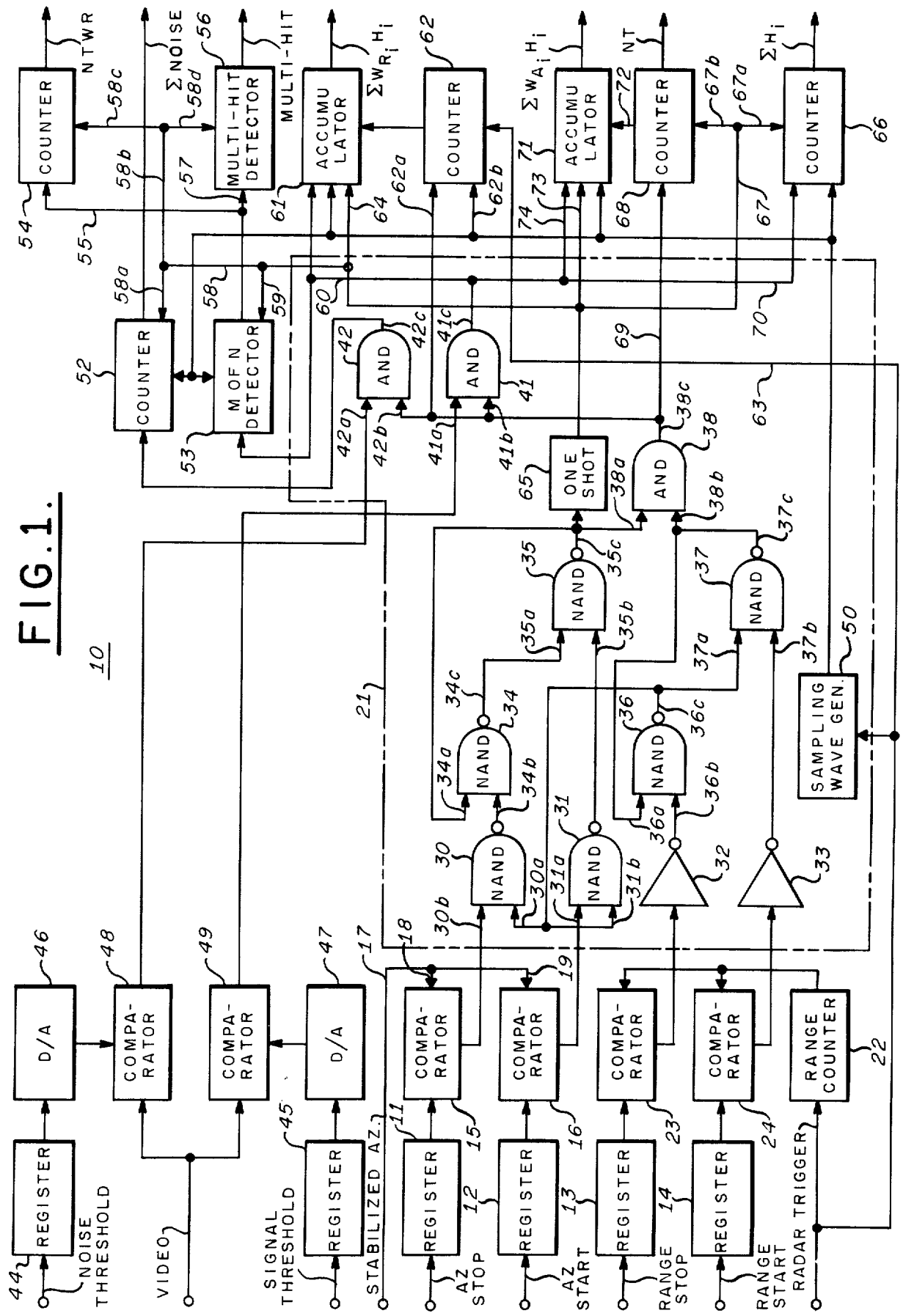
FIG. 1 is a block diagram of the tracking circuitry contained in the video processor of the present invention.

In FIG. 1, tracking circuitry for a track-while-scan radar system video processor 10 includes four registers 11, 12, 13 and 14, each of which is coupled to a computer (not shown). Digital signals representative of an area within which a track target is located (tracking window) are coupled from the computer and stored in these registers. The angular boundaries of the window are stored in registers 11 and 12 while the range boundaries are stored in registers 13 and 14. Registers 11 and 12 are coupled to comparators 15 and 16 which in turn are coupled to receive digital signals via lines 17, 18 and 19 that are representative of the stabilized angular position of the radar antenna (not shown). When the stabilized azimuth signal matches the leading edge signal of the azimuth window (az start) stored in register 12, a pulse is coupled from comparator 16 to a control unit 21 opening the azimuth window gate therein. The azimuth window gate remains open until the stabilized azimuth signal matches the railing edge signal of the azimuth window stored in register 11, at which time a pulse is coupled from comparator 15 to the control unit 21 thereby closing the azimuth window gate.

A range count initiated by the radar trigger and accumulated in a range counter 22 is coupled to comparators 23 and 24. When the accumulated count is equal to the count representative of the leading edge of the range window stored in register 14, a pulse is coupled from comparator 24 to the control unit 21 opening the range window therein. The range window remains open until the count accumulated in the range counter 22 equals the count representative of the trailing edge of the range window stored in register 13. At this time, a pulse is coupled to comparator 23 to the control unit 21 causing the range window gate to close.

The control unit 21 provides a window in which target data may be gathered only when both the range and azimuth windows are open. Control unit 21 may comprise NAND gate 30 having a first input terminal 30b coupled to the output terminal of comparator 15, NAND gate 31 having a first input terminal 31a coupled to the output terminal of comparator 16, and inverters 32 and 33 having input terminals coupled respectively to the output terminals of comparators 23 and 24. The output terminals of NAND gates 30 and 31, and inverters 32 and 33 are resepectively coupled to input terminals 34b, 35b, 36b and 37b of NAND gates 34, 35, 36 and 37. A second input terminal 34a of NAND gate 34 is coupled to the output terminal 35c of NAND gate 35 which also couples to a first input terminal of AND gate 38 while the output terminal 34c of NAND gate 34 couples to a second input terminal 35a of NAND gate 35. A second input terminal 36a of NAND gate 36 is coupled to the output terminal 37c of NAND gate 37 which also couples to a second input terminal 38b of AND gate 38 while the output terminal 36c of NAND gate 36 couples to a second input terminal 37a of NAND gate 37, a second input terminal 30a of NAND gate 30 and a second input terminal 31b of NAND gate 31. Prior to the opening of the azimuth window, comparators 15 and 16 couple low level signals to the NAND gates 30 and 31 which in turn couple high level signals to the input terminals 34b and 35b of NAND gates 34 and 35, respectively. At this time, a low level signal exists at the output terminal 35c of NAND gate 35 which is coupled to the second input terminal 34a of NAND gate 34 establishing a high level signal at the output terminal 34c of NAND gate 34 which in turn is coupled to the second input terminal 35a of NAND gate 35. When the stabilized antenna azimuth position equals the azimuth window's leading edge, as represented by the digital signal contained in register 12, comparator 16 couples a high level signal to terminal 31a of NAND gate 31 causing the signal at the first input terminal 35b of NAND gate 35 to a low level when the signal at the output terminal 36c of NAND gate 36 is at a high level, thus establishing a high level signal at the output terminal 35c of NAND gate 35 which is coupled to the second input terminal 34a of NAND gate 34 and to input terminal 38a of AND gate 38. The coupling from the output terminal 36c of NAND gate 36 to the second input terminals 30a and 31b of NAND gates 30 and 31 inhibits NAND gates 30 and 31 whenever the signal at the output terminal 36c is at a low level. As will be made clear by the subsequent discussion, this prevents the initiation or the termination of the azimuth window until the completion of a range window. NAND gate 34 now having two high level signals at its input terminals provides a low level signal at the output terminal 34c that is coupled to the second input terminal 35a of NAND gate 35. Since the second input terminal 35a of NAND gate 35 is at a low level, when the first input terminal 35b of NAND gate 35 returns to a high level; the level of the output terminal 35c of NAND gate 35, the level of the second input terminal of NAND gate 34 and the output terminal 34c of NAND gate 34 remain unchanged.

The combination of inverters 32 and 33 and NAND gates 36 and 37 operate in a similar manner, however, without inhibiting signals. Thus when the range count from range counter 22 becomes equal to the range count stored in register 14, comparator 24 couples a high level signal to the input terminal of inverter 33 which in turn causes a high level signal to be coupled to the other input terminal of AND gate 38 thus providing a high level signal at the output terminal 38c of AND gate 38 (the tracking window) which is then coupled to terminals 41b and 42b of AND gates 41 and 42 and counters 62 and 68, thus opening these gates through which target data may now be accumulated and enabling counter 62 to count. The tracking window remains open until the range count from counter 22 is equal to the range stop, as represented by digital signals stored in register 13. When the range count equals the range stop, a high level signal is coupled from comparator 23 to inverter 32 which in turn couples a low level signal to the input terminal 36b of NAND gate 36. This low level signal coupled with the high level signal existing at the input terminal 36a of NAND gate 36 causes the output terminal 36c of NAND gate 36 to achieve a high level signal, no longer inhibiting NAND gates 30 and 31. This high level signal is coupled to input terminal 37a of NAND gate 37. Input terminals 37a and 37b of NAND gate 37 each now have high level signals coupled thereto causing a low level signal to appear at the output terminal 37c, the input terminal 36a of NAND gate 36 and input terminal 38b of AND gate 38. Thus, when the input terminal 36b of NAND gate 36 returns to a high level signal at the conclusion of the output pulse from comparator 23, all logic levels on NAND gates 36 and 37 have returned to the initial conditions and the gate may be reopened when the range counter agains equals the digital signal stored in register 14 representative of the next range to start. The transition from a high to low level signal at the input terminal 38b of AND gate 38 causes the output terminal 38c to achieve a low level signal thus closing AND gates 41 and 42, disabling counter 62 and incrementing counter 68. Output terminal 38c is held low when input 38a is low.

The sequence of signal transitions that occur when the digital signal representative of the stabilized azimuth antenna position equals digital signals stored in register 11 that is representative of the az stop angle are similar to the transitions described for closing the range window. Thus, the tracking window is closed each time range stop distance is achieved and when the az stop angle is achieved. The az stop transitions are delayed to the end of an open track window, if an az stop pulse occurs during an open track window by the inhibiting low signal from the output terminal 36c of NAND gate 36 to the input terminal 30a of NAND gate 30. Thus several tracking gates open and close between the occurrences of az start and az stop pluses. In each case only full tracking gates from range start to range stop are allowed as a result of the inhibiting signal preventing transitions during an open gate. This prevents erroneous data from being gathered.

A digital signal representative of a noise threshold level is coupled from the computer and stored in register 44 and a digital signal representative of the signal threshold is similarly stored in register 45. Registers 44 and 45 are coupled to digital-analog converters 46 and 47 respectively wherein the digital signal representative of the noise and signal thresholds are converted to analog signals. These analog signals are respectively coupled to comparators 48 and 49 to which the analog video signals from the radar are also coupled. Wnenever the radar video signals exceed the noise or signal thresholds, a pulse appears at the output terminals of comparators 48 and 49 which are coupled to input terminals 42a and 41a of AND gates 42 and 41, respectively. AND gates 42 and 41 pass the outputs of comparators 48 and 49 respectively when enabled by a high level signal from AND gate 38. The output terminal of AND gate 42 is coupled to counter 52. Sampling wave generator 50 is triggered at the commencement of each range sweep by the radar trigger and for the duration of the range sweep provides a train of pulses each of which is representative of one range bin within the range sweep. This pulse train is coupled to counters 52, 62 and 66, M of N detector 53, and accumulators 61 and 71. Counter 52 determines the number of times output pulses from comparator 48 coincide with the tracking window from AND gate 38 and pulses from sampling wave generator 50, thus determining the number of video samples that exceed the noise threshold within the tracking window. A pulse is coupled from one shot 65 to counter 52 via leads 58 and 58a. With reception of this pulse, counter 52 couples the total number of noise counts within the tracking window to the computer and then is reset. The input terminal of one shot 65 is coupled to the output terminal 35c of NAND gate 35 and fires a pulse only when the signal level at the output terminal 35c undergoes a transition from a high level to a low level. Thus the one shot only fires at the end of the azimuth window which signifies the end of the tracking window.

The pulses representative of the radar video exceeding the signal threshold are coupled from the comparator 49 via AND gate 41 to M of N detector 53 to which the output terminal of sampling wave generator 50 is also coupled. The M of N detector provides a pulse whenever M of N contiguous radar transmissions contain pulses from sampling wave generator 50 that coincide with pulses from AND gate 41. This pulse is coupled to counter 54 via line 55 and to multi-hit detector 56 via line 57. The accumulated count of counter 54 is representative of the number of pulse transmissions with radar returns (NTWR) and is utilized by the computer to determine the azimuthal angle subtended by the target. When counter 54 receives a pulse from one shot 65 via leads 58, 58b and 58c, the accumulated count is coupled to the computer and then is reset. Since the M of N detector provides a pulse whenever M hits are recorded in N transmissions, a pulse will be coupled from detector 53 for each succeeding transmission after the threshold has been achieved for targets that cover extended angular regions. These pulses will continue until the target has been completely traversed. If after one or more pulses, pulses then cease for one or more transmissions and commence thereafter a multiple target situation is indicated within the tracking window. This interruption is detected by the multi-hit detector 56 which couples a pulse to the computer as a result thereof when it receives a pulse via leads 58, 58b and 58d from one shot 65 and then is reset. M of N detector 53 is also reset by the pulse from one shot 65 via lead 59.

The output terminal 41c of AND gate 41 is also coupled via lead 60, to an accumulator 61, to which the output terminal of counter 62 also coupled, while one input terminal 62a of counter 62 is coupled to the output terminal 38c of AND gate 38 and a second input terminal 62b is coupled to the output of sampling wave generator 50. Counter 62 counts the number of range bins that have been traversed by the range sweep from the commencement of the tracking window (output of AND gate 38). When accumulator 61 is strobed by a pulse from AND gate 41, the count in counter 62 at that time is transferred to the accumulator 61 and added to the count therein, once for each coincident sample pulse from sampling wave generator 50. Counter 62 is reset at the commencement of each range sweep by a pulse coupled from the radar trigger via lead 63 and the process is repeated. Accumulator 61 continues to accumulate a count in this manner until it receives a pulse via lead 64 from one shot 65 at which time the accumulated count, which is the weighted sum of range returns within the tracking window, is transferred to the computer and the accumulator 61 is reset.

The output terminal 41c of AND gate 41 is also coupled to counter 66 which is advanced with each pulse coupled from AND gate 41 coincident with a pulse from sampling wave generator 50. This count continues until a pulse is coupled via leads 67 and 67a from one shot 65 at which time total count accumulated is transferred to the computer and counter 66 is reset. This total count represents the total number of returns received by the radar antenna within the tracking window. The computer divides the weighted sum of range returns from accumulator 61 by the count transferred from counter 66, the resulting quotient being the range centroid of the tracked target.

A similar procedure is employed to determine the angular centroid of the tracked target. The input terminal of counter 68 is coupled to the output terminal 38c of AND gate 38. At the closing of each track window for each range sweep which AND gate 38 is enabled by NAND gate 35, NAND gate 37 goes from a high level to a low level causing output 38c of AND gate 38 to go low, triggering edge-triggered counter 68. When a pulse is coupled from the output terminal 41c of AND gate 41 via line 74 to accumulator 71, the count in counter 68 is entered into accumulator 71 via line 72 and added to the count therein. Each pulse from AND gate 41, representative of a radar return, causes the count contained in counter 68 to be added to the accumulated count in accumulator 71, once for each coincident pulse from sampling wave generator 50. Thus a count representative of a given range sweep is added in accumulator 71 for as many times as sample pulses are coincident with radar returns within the given range sweep. This process continues until the tracking window has been completely traversed and a pulse is coupled from one shot 65 to counter 68 via leads 67 and 67b and to accumulator 71 via lead 73. With the reception of this pulse, counter 68 couples the total number of transmissions within the tracking window to the computer and then is reset while accumulator 71 couples the sweep weighted sum, which corresponds to the weighted sum of azimuth radar returns, to the computer and then is reset. The weighted sum of azimuth returns is then divided by the total number of hits coupled to the computer from counter 66, the quotient of which determines the azimuth centroid of the tracked target.

Figure 2:
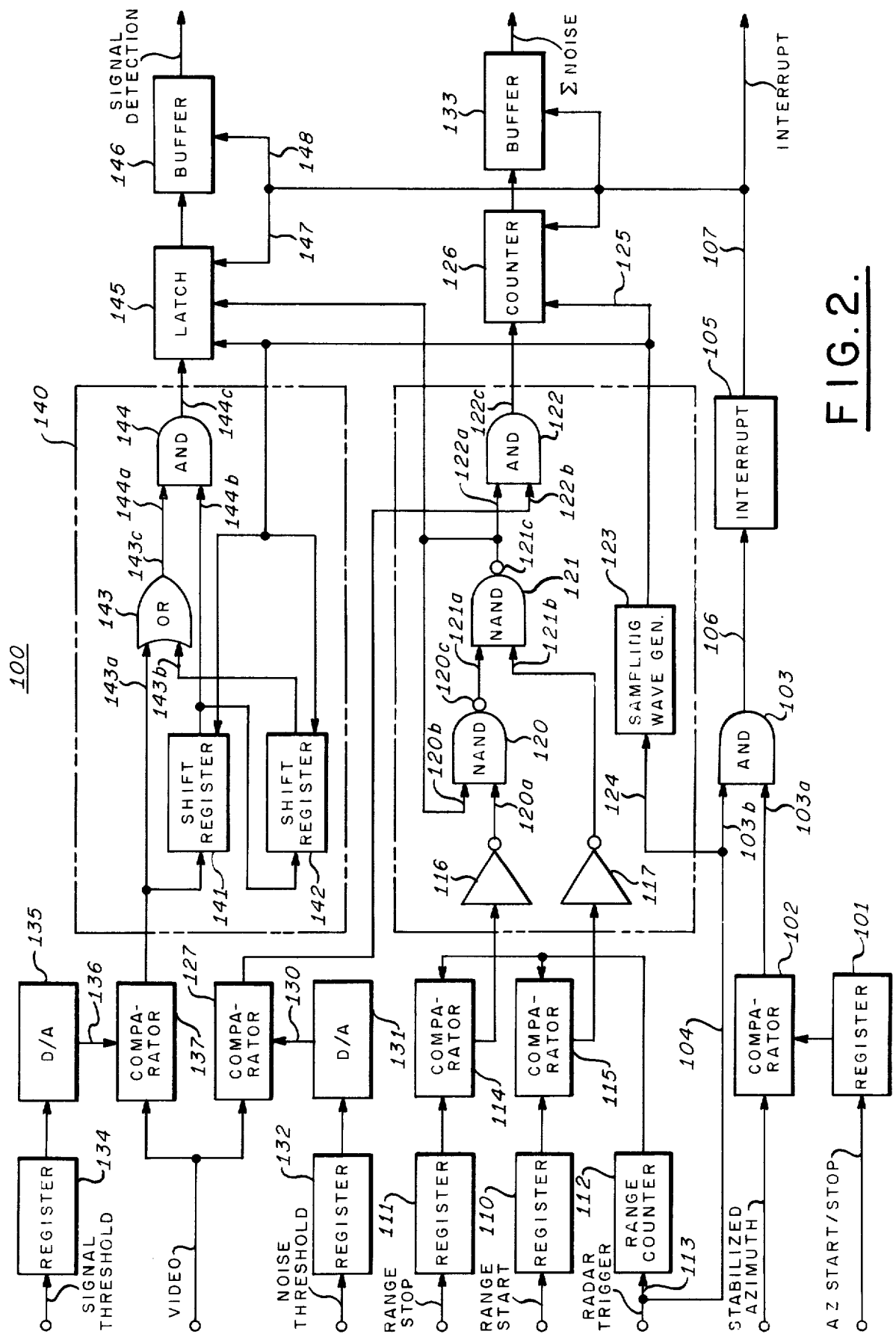
FIG. 2 is a block diagram of the target detection circuitry contained in the video processor of the present invention.

Detection circuitry for the track-while-scan radar digital video processor is shown in FIG. 2. Input signals to this circuitry, such as noise and signal thresholds, az start and stop, range start and stop, radar trigger, and the video to be processed emanate from the same sources as the corresponding input signals to the tracking circuitry previously described. In FIG. 2, the detection circuitry 100 may comprise a register 101 wherein a digital signal representative of an azimuth detection boundary is entered from the computer and stored. This signal is compared in comparator 102 with a digital signal coupled from the computer or other source which represents the stabilized azimuth position of the antenna. When the stabilized azimuth digital signal is equal to the digital signal stored in register 101, a high level signal is coupled from comparator 102 to an input terminal 103a of AND gate 103. Radar trigger pulses are coupled to the other input terminal 103b of AND gate 103 via lead 104. When a radar trigger pulse and a high level signal from comparator 102 coincide at input terminals 103a and 103b, AND gate 103 couples a pulse to interrupt 105 via lead 106. Interrupt 105 then fires coupling a pulse to the computer via lead 107 signalling the computer that an angular section has been completed and that a new digital signal, representative of the trailing edge of the succeeding second angular section, is to be coupled to register 101. This pulse also signals the computer to enter digital signals into buffers (not shown) from which registers 110 and 111 are loaded by interrupt pulse 105. The signals transferred into registers 110 and 111 are representative of the leading range edge and the trailing range edge of the range window in the succeeding angular search section, thus completing the boundary specification for the next search interval.

The radar trigger pulse is also coupled to range counter 112 via lead 113. The output terminal of the range counter is coupled to comparators 114 and 115, the output terminals of which are coupled to inverters 116 and 117, respectively. The output terminal of inverter 116 is coupled to an input terminal 120a of NAND gate 120, the output terminal 120c of which is coupled to an input terminal 121a of NAND gate 121, the other input terminal 121b of which is coupled to the output terminal of inverter 117 while the output terminal 121c is coupled to the other input terminal 120b of NAND gate 120. The combination of registers 110 and 111, range counter 112, comparators 114 and 115, inverter 116 and 117, and NAND gates 120 and 121 operate to provide the range window in the same manner as the range window circuitry of the tracking portion of the digital video processor providing a high level signal at the output terminal 121c of NAND gate 121 when the range window is open and a low level signal otherwise, as previously described. The output terminal 121c of NAND gate 121 is coupled to one input terminal 122a of AND gate 122, the other input terminal 122b of which is coupled to the output terminal of the noise video comparator 127. Comparator 127 provides a high level signal whenever radar video signals exceed an analog signal coupled via lead 130 from the output terminal of a digital to analog (D/A) converter 131, the input terminal of which is coupled to a register 132 in which a digital signal, that is representative of a computed noise threshold, is stored. A buffer (not shown) couples the digital signal from the computer to register 132.

The output terminal 122c of NAND gate 122 is coupled to counter 126 to which a sampling wave generator 123 is also coupled. The sampling wave generator 123 is triggered at the commencement of each range sweep by the radar trigger pulse, which is coupled to the sampling wave generator via lead 124, and for the duration of the range sweep provides a train of pulses each of which is representative of one range bin within the range sweep. Whenever a high level signal from comparator 127 coincides with a high level signal from NAND gate 121, output 122c of AND gate 122 goes high enabling counter 126 to count the sampling wave generator 123 pulses coupled via lead 125. This count increases until a pulse from interrupt 105 is coupled to counter 126 and to buffer 133 at which time the count in counter 126, which represents the number of times the radar video signal exceeds the noise threshold within the search window as defined by the azimuth interval from register 101 and the range interval from registers 110 and 111, is transferred to buffer 133 which, as a result of the prior interrupt pulse, has transferred the count previously stored therein to the computer. Counter 126 is reset by the pulse from interrupt 105.

A digital signal representative of a signal threshold is coupled from the computer via a buffer (not shown) and stored in register 134 which in turn is coupled to digital-to-analog (D/A) converter 135. The analog signal derived from the digital signal stored in register 134 is coupled via lead 136 to comparator 137 wherein radar video signals are compared thereto. Whenever the radar video signals exceed the analog signal from D/A converter 135, comparator 137 provides a high level signal at its output terminal. To prevent the recording of random noise spikes as a radar return signal, the output terminal of comparator 137 is coupled to a defruiter 140.

Defruiter 140 may comprise: a first shift register 141, the input terminal of which is coupled to the output terminal of comparator 137; a second shift register 142, the input terminal of which is coupled to the output terminal of shift register 141; an OR gate 143, a first input terminal 143a of which is coupled to the output terminal of comparator 137 while a second input terminal 143b is coupled to output terminal of shift register 142; and an AND gate 144, a first input terminal 144a of which is coupled to the output terminal 143c of OR gate 143 while a second input terminal 144b is coupled to the output terminal of shift register 141. As each range bin of the range sweep, is sampled by pulses from sampling wave generator 123, the data contained therein is stored in a cell of shift register 141. At the completion of a range sweep, shift register 141 contains ones or zeroes in each of its cells corresponding to a hit or a no hit in the range bin representative thereof. At the initiation of the succeeding range sweep, data is again entered in shift register 141 which transfers the data accumulated on the previous sweep to shift register 142. At the completion of the second range sweep, the cells of shift registers 141 and 142 contain the range bin data accumulated on the two previous sweeps with corresponding cells in the shift registers containing data from the same relative range bin in each of the sweeps, with the data from the first sampled range bin at the output cell of each of the shift registers. When the third range sweep begins, the output data from comparator 137 in the first range bin is coupled to OR gate 143 and is entered into shift register 141, shift register 141 provides data from the first range bin within the second range sweep to the input terminal 144b of AND gate 144 and to the input terminal of the second shift register 142, which provides the data contained in the first range bin of the first range sweep to the input terminal 143b of OR gate 143. This process continues for each successive range bin and each successive range sweep. In this manner signals are provided to OR gate 143 and AND gate 144 which are representative of the radar returns in corresponding range bins for successive range sweeps; the signals for the center range sweep being coupled to terminal 144b of AND gate 144 from shift register 141 and the signals from the range sweeps on either side thereof being coupled to the input terminals 143a and 143b of OR gate 143. This circuitry operates to provide a high level signal at the output terminal 144c of AND gate 144 whenever the output of comparator 137 provides a high level signal for the middle range sweep and for either the succeeding or preceding range sweeps thereof for the same range bin.

The output terminal 144c of AND gate 144 is coupled to an input terminal of latch 145, which is enabled by a sample pulse from sample wave generator 123 coincident with a high level signal from the output terminal 121c of NAND gate 121. Latch 145 is thus set to a one if for any range or angular position, within the search window, AND gate 144 provides a high level signal coincident with a sample pulse from sampling wave generator 123. The output terminal of latch 145 is coupled to buffer 146 and each are coupled to the output terminal of interrupt 105. When a pulse is received from interrupt 105 by latch 145 and buffer 146, the data in latch 145 is transferred to buffer 146 which is then coupled to the computer when the computer responds to the interrupt. Latch 145 is reset by the pulse from interrupt 105.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An apparatus for processing video signals derived from a radar system of the type including an antenna and a receiver coupled thereto for receiving return signals from a plurality of range bins within an illuminated area comprising:
    means for comparing signals representative of said illuminated area location with signals representative of predetermined boundaries which define a detection window and for providing signals that indicate when said detection window has been entered and traversed;
    means for comparing said video signals with a predetermined signal threshold level to provide a pulse whenever said video signal exceeds said threshold;
    means coupled to said signal comparison means and said boundary comparison means for providing a sweep weighted accumulated sum of said pulses which indicate said video signals exceed said threshold for a range sweep within said detection window said accumulated sum being obtained by assigning a weighting factor to each range sweep, which increases for each succeeding range sweep, and by adding said weight to a previously accumulated sum whenever said video, for a given range sweep, exceeds said threshold; and
    a counter coupled to receive said pulses indicative of said video signal exceeding said threshold level within said detection window and providing a count thereof.

2. An apparatus for processing video signals in accordance with claim 1 wherein said sweep weighted accumulated sum means includes:
    means for providing control signals in response to signals from said boundary comparison means and said signal comparison means, said control signals including a pulse for each range sweep within said detection window, a pulse for each video signal within said detection window that exceeds said threshold level, and a pulse at the conclusion of said detection window; and
    accumulator means coupled to said control signal means for assigning a weight to each of said range sweeps within said detection window and for accumulating said sweep weighted accumulated sum.

3. An apparatus for processing video signals in accordance with claim 2 wherein said accumulator means includes:
    a counter coupled to receive and count said range sweep pulses;
    means coupled to said counter and to said control means enabled by said pulse from said control unit that is indicative of said video signal exceeding said threshold signal for adding the sweep count in said counter to a stored accumulated count, said accumulation continuing for the duration of said detection window at which time said accumulated count and said counter are reset by said detection window conclusion pulse from said control means.

4. An apparatus for processing video signals in accordance with claim 2 wherein said control means additionally provides a pulse for each range bin within said detection window and further including means coupled to said control means for accumulating a range weighted sum which is obtained by assigning a weighting factor to each range bin within said detection window, said weighting factor for each succeeding range bin within a range sweep being greater than the weighting factor of the previous range bin with corresponding range bins in all range sweeps having equal weighting factors, said weighting factor being added to a previously accumulated count when said video signal corresponding to said radar return within said range bin exceeds said threshold level, said accumulation continuing for the duration of said detection window.

5. An apparatus for processing video signals in accordance with claim 4 including means to inhibit the termination of a detection or the initiation of a subsequent detection window within the boundaries of said detection window.

6. An apparatus for processing video signals in accordance with claim 4 wherein said control means includes:
- a first NAND gate having a first input terminal coupled to said boundary comparison means to receive signals indicating the commencement of the angular boundary of the detection window, a second input terminal, and an output terminal;
- a second NAND gate having a first input terminal coupled to said boundary comparison means to receive signals indicating the angular conclusion of said detection window, a second input terminal, and an output terminal;
- a third NAND gate having a first input terminal coupled to said output terminal of said first NAND gate, a second input terminal and an output terminal;
- a fourth NAND gate having a first input terminal coupled to said output terminal of said second NAND gate, a second input terminal coupled to said output terminal of said third NAND gate, and an output terminal coupled to said second input terminal of said third NAND gate;
- means coupled to said output terminal of said third NAND gate for providing a pulse when the signal level at said output terminal of said third NAND gate undergoes a transition from a high level to a low level whereby said window conclusion signal is provided;
- a first inverter coupled to said boundary comparison means to receive signals indicating the commencement of the range interval of said detection window;
- a second inverter coupled to said boundary detection means to receive signals indicating the conclusion of said range interval of said detection window;
- a fifth NAND gate having a first input terminal coupled to said second inverter, a second input terminal and an output terminal coupled to said second input terminals of said first and second NAND gates;
- a sixth NAND gate having a first input terminal coupled to said first inverter, a second input terminal coupled to said output terminal of said fifth NAND gate, and an output terminal coupled to said second input terminal of said fifth NAND gate;
- a first AND gate having a first input terminal coupled to said output terminal of said third NAND gate, a second input terminal coupled to said output terminal of said sixth NAND gate and an output terminal; and
- a second AND gate having a first input terminal coupled to said output terminal of said first AND gate, a second input terminal coupled to said signal comparison means and an output terminal at which said video signal pulses within said detection window are provided.

7. An apparatus for processing video signals in accordance with claim 2 further including:
- means coupled to said video signal comparison means for providing a pulse whenever said video signal exceeds said signal threshold level for M of N successive radar transmissions;
- means coupled to said M of N detection means for providing a pulse whenever a train of pulses from said M of N detection means ceases and then recommences; and
- means coupled to said M of N detection means and to said control signal means to receive said window conclusion pulses therefrom for providing a count of the number of output pulses from said M of N detection means within said detection window.

8. In a video signal processor for processing video signals derived from radar return signals, an apparatus for minimizing the probability of identifying random signals as radar returns comprising:
- a first shift register having an output terminal, an input terminal coupled to receive signals representative, of said radar return signals in range bins of a range sweep, and a multiplicity of storage cells each corresponding to a range bin wherein data corresponding to said received signals of said range bins are stored;
- a second shift register having an input terminal coupled to said output terminal of said first shift register, an output terminal, and a multiplicity of storage cells wherein data from a first range sweep is stored as data from a second range sweep is stored in said first shift register whereby at the conclusion of said second range sweep data representative of return signals in each range bin of first range sweep is stored in said second shift register and data from said second range sweep is stored in said first shift register;
- an OR gate having a first terminal coupled to said input terminal of said first shift register, a second input terminal coupled to said output terminal of said second shift register and an output terminal, said OR gate providing a high level signal when a high level signal from corresponding range bins in a third range sweep or said first range sweep is coupled to either of said input terminals; and
- an AND gate having a first input terminal coupled to said output terminal of said OR gate, a second input terminal coupled to said output terminal of said first shift register and an output terminal at which a high level signal is provided whenever a high level signal exists for corresponding range bins in either said first or third range sweeps simultaneously in said second range sweep.

* * * * *